United States Patent Office 3,427,000
Patented Feb. 11, 1969

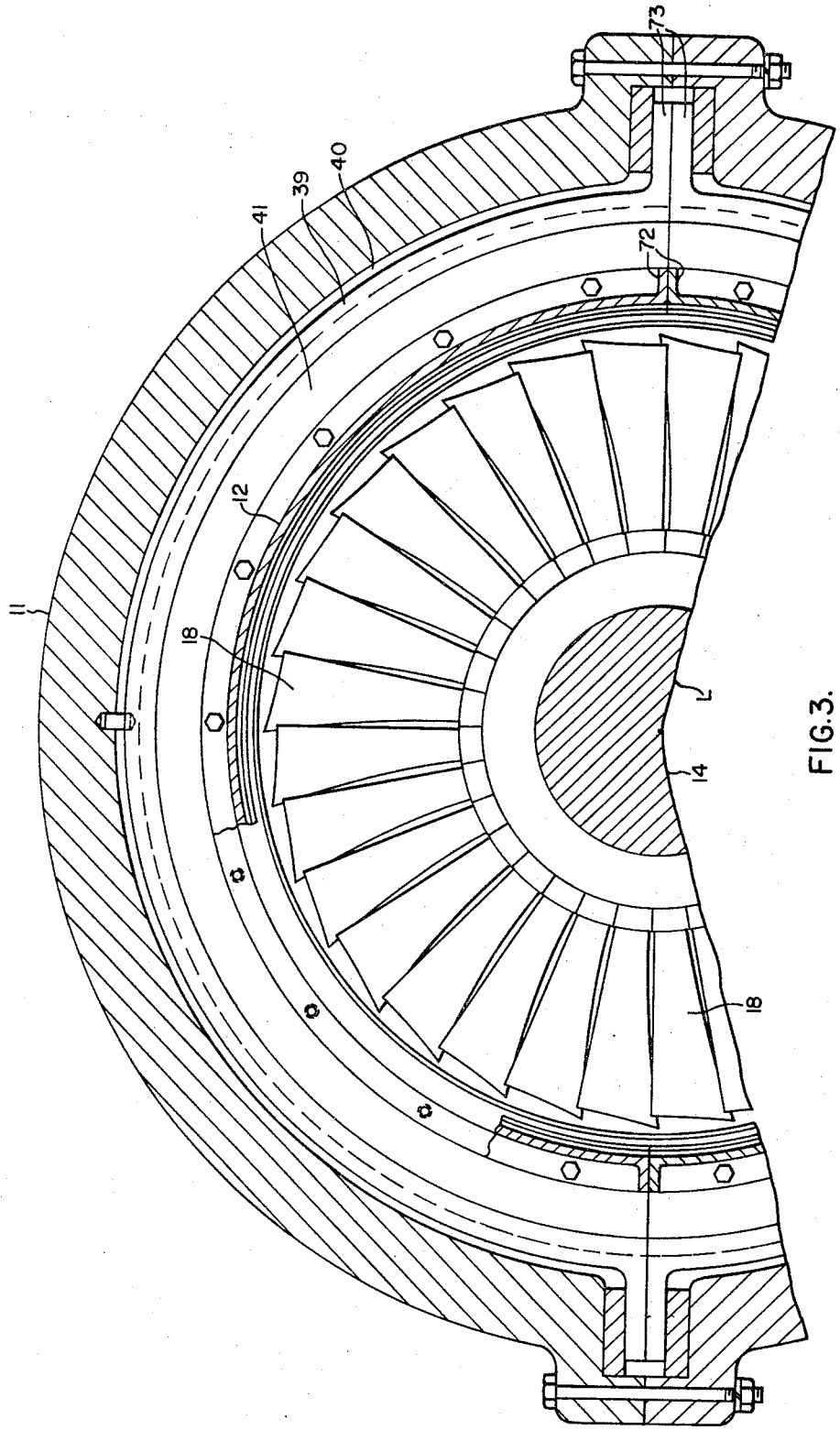

3,427,000
AXIAL FLOW TURBINE STRUCTURE
Augustine J. Scalzo, Philadelphia, Pa., assignor to Westinghouse Electric Corporation, Pittsburgh, Pa., a corporation of Pennsylvania
Filed Nov. 14, 1966, Ser. No. 593,992
U.S. Cl. 253—39.1        10 Claims
Int. Cl. F01d 25/12, 9/06

ABSTRACT OF THE DISCLOSURE

An axial flow gas turbine having inner and outer casings, the inner casing being joined to the outer casing by an annular flange structure at either end. One of the flanges is substantially flexible in axial direction to permit unrestrained thermal axial elongation, and both flanges are retained in radially slidable relation in the outer casing to permit unrestrained thermal radial growth of the inner casing. The stationary blades are formed in integral arcuate groups and are resiliently secured to the inner casing at a central point in their outer shroud segments to permit circumferential thermal elongation to occur without change in the blade gauging, and the outer shroud segments have integral portions encompassing the rotor blades to define the outer periphery of the motive fluid path past the rotor blades. The stationary blades are air cooled and are formed with inner and outer hollow shroud segments and hollow vane portions, and the cooling air is admitted to the outer shroud through a passage through the resilient securing means.

---

This invention relates to axial flow turbine structures, more particularly to such turbine structures employing hot motive fluid, and has for an object to provide an improved structure of this type.

Turbines operated with hot motive gases, for example gas turbines, require cooling fluids, such as air, to control temperatures of stationary as well as rotating components. Turbines of this type are usually provided with outer casings divided in a horizontal plane with upper and lower halves and bolted together, for ease of assembly and service. Also pressurized cooling air or other suitable fluid is directed through the outer casing into the annular plenum chamber or space between the outer casings and outer diaphragm shrouds and then through the stationary turbine blades. It has been found that undesirable leakage of cooling air from the annular space into the motive fluid flow path occurs in operation. This leakage is most pronounced at the horizontal joint of the turbine diaphragms and an analysis of the harmonic vibrations of the horizontal joint leakage pulses indicates that even harmonics of the turbine running speed are produced which in some instances can result in blade excitation leading to failure.

Assuming that leakage of cooling air past the horizontal joint can be eliminated, an excitation pattern can still persist as a result of changes in stationary blade gauging or pitch, i.e. spacing between adjacent blades through which the motive fluid flows. Changes in gauging results when the outer shrouds of the stationary blade diaphragms expand relative to the casing with consequent uneven shifting in circumferential direction of the stationary blades. The amount of gauging change is proportional to the number of vanes in a group.

In addition to the above, shroud restraints in existing 180° divided diaphragms can develop excessive thermal stresses of a damaging nature during transient operating temperature cycles.

One of the primary objects of this invention is to provide a turbine structure having inner and outer casings in which leakage of cooling air past the horizontal joint of the inner casing, changes in stationary blade gauging, and shroud restraint on the stationary blades are substantially eliminated.

A further object of the invention is to provide an improved turbine structure in which the inner casing is free to expand in radial and axial directions relative to the outer casing while still maintaining its concentricity therewith.

Yet another object is to provide an improved stationary blade diaphragm and inner casing structure for a turbine wherein the blades are formed in a manner to conduct cooling air flow, yet leakage of the cooling air therepast is minimized, and in which the blades are free to expand relative to each other and the casing.

A still further object is to provide an improved mounting arrangement for an annular row of hollow air cooled stationary blades.

Briefly, in accordance with the invention there is provided an axial flow turbine having an annular row of stationary blades, an annular row of rotatable blades carried by a rotor and cooperatively associated with the stationary blades, and an annular inner casing encompassing the stationary blades and rotatable blades and carrying the stationary blades.

There is further provided an annular outer casing encompassing the inner casing and jointly therewith providing a common plenum chamber or space of annular shape. Pressurized coolant fluid is admitted to the plenum chamber and thence, through passages formed in the stationary blades, into the motive fluid path, thereby to prevent overheating of the stationary blades, the rotatable blades, and the rotor.

The inner casing is supported by the outer casing in a manner permitting thermal expansion in radial direction and in one axial direction while still maintaining concentricity with the central axis of the rotor.

The blades are preferably formed in arcuate groups, each group comprising a plurality of hollow vane portions connected to an arcuate hollow outer shroud portion and an arcuate hollow base or inner shroud portion. The blade groups are connected to the inner casing by hollow expansible keying pins in a manner providing a coolant flow communication between the plenum chamber and the hollow outer shroud portions, and the hollow base portions of the blade groups are provided with outlet apertures, so that coolant fluid is directed towards the rotor blades to cool the same after initially passing through the stationary blades to cool them.

The above and other objects are effected by the invention as will be apparent from the following description and claims taken in connection with the accompanying drawings, forming a part of this application, in which:

FIG. 3 is a sectional view taken on line III—III of FIGURE 1.

Figure 1:
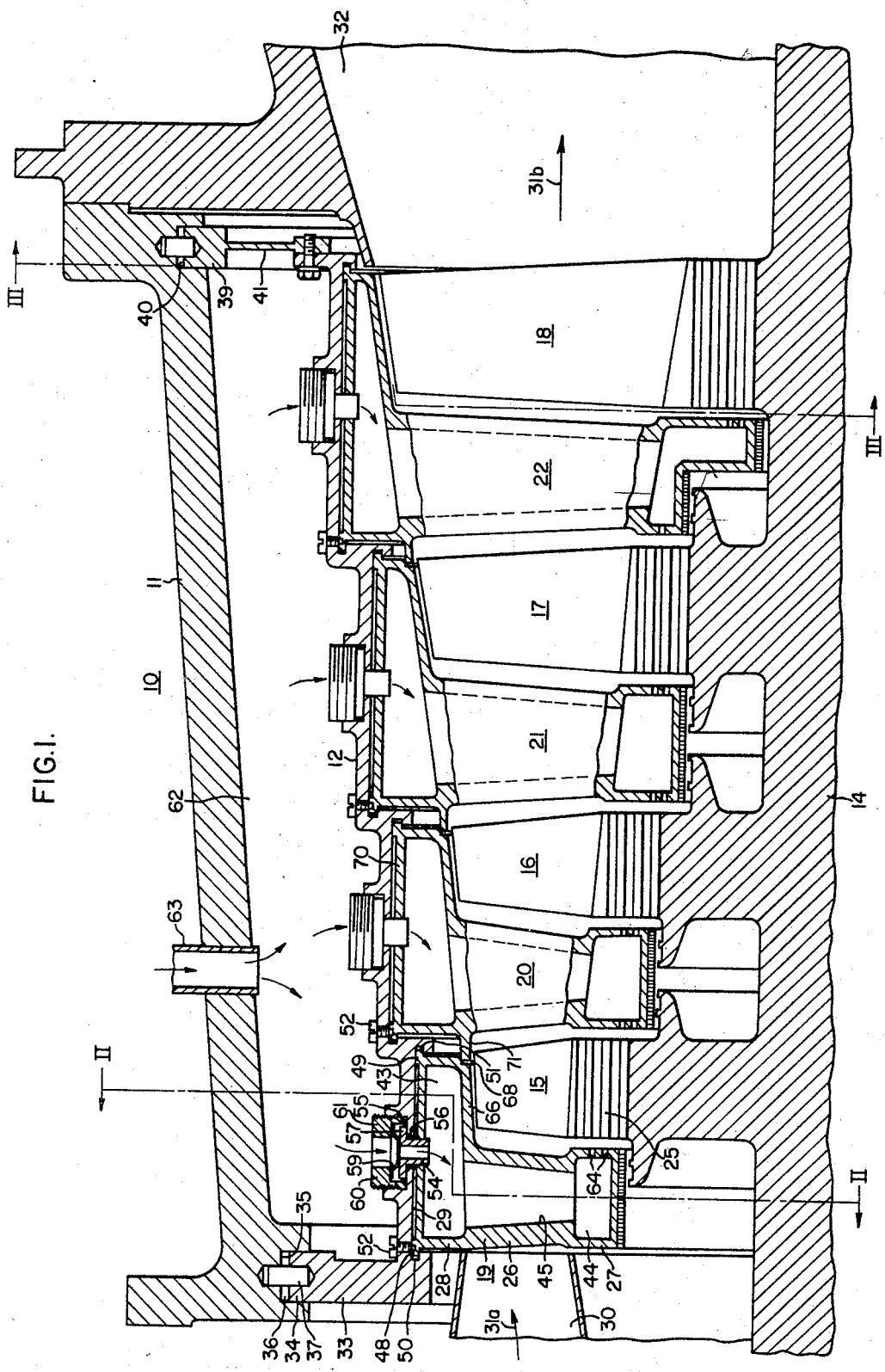
FIGURE 1 is an axial sectional view of a portion of a gas turbine incorporating the invention.

Referring to the drawings in detail, in FIGURE 1, there is shown an axial flow multi-stage gas tubine 10. Only the upper half and a portion of the lower half of the turbine is shown since the lower half is identical to the upper half. The turbine 10 comprises an outer casing 11 of generally tubular or annular shape, an inner casing 12 of annular shape encompassed by the outer casing 11, and a rotor 14 rotatably supported within the inner casing 12 in any suitable manner (not shown) and having a plurality (four in this example) of annular rows or arrays of blades 15, 16, 17 and 18.

Cooperatively associated with the rotor blades to form four stages for motive fluid expansion, is an equal number of blade diaphragms or annular rows of stationary blades 19, 20, 21 and 22 supported within the inner casing 12.

The rotor blades 15–18 are substantially similar to each other except for a gradual increase in height from left to right and are of the unshrouded type with a radially outwardly extending vane portion 24 and a root portion 25 suitably secured to the rotor 14.

In a similar manner, the stationary blades 19–22 are substantially similar to each other but gradually increase in height from left to right, and are provided with a radially inwardly extending vane portion 26, a base portion 27 and an outer shroud portion 28 abutting the annular inner wall surface portion 29 of the inner casing 12.

As well known in the art, hot motive fluid, such as pressurized combustion gas, generated in a suitable fuel combustion chamber (not shown) is directed through an inlet passageway 30 past the stationary blades and rotor blades, in the direction indicated by the arrow 31a, with resulting expansion of the motive fluid to rotate the rotor 14 about its longitudinal axis L, and thence directed through a suitable oulet 32, as indicated by the arrow 31b.

Figure 2:
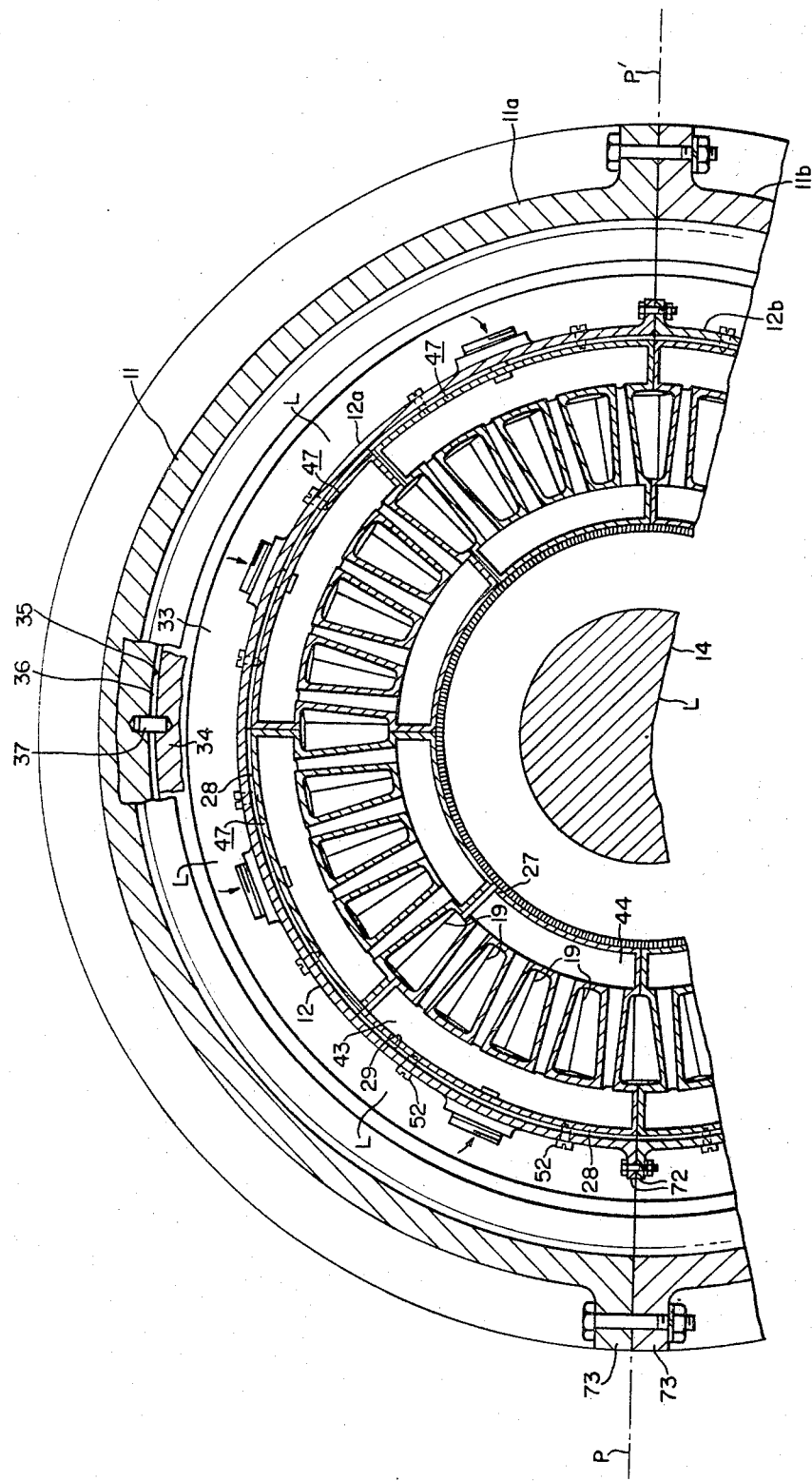
FIG. 2 is a sectional view taken on line II—II of FIGURE 1.

In accordance with the invention, as shown in FIGS. 1 and 2, the inner casing 12 is provided with a rigid annular end wall portion 33 extending radially outwardly and having its outer annular peripheral portion 34 slidably received in an annular recess 35 formed in the outer casing 11. A small annular clearance space 36 is maintained, so that in operation thermal circumferential expansion of the inner casing 12 relative to the outer casing is permitted to occur without internal stresses. Also, a plurality of radially extending dowel pins 37 (only one shown) are slidably interposed between the peripheral wall portion 34 and the outer casing 11 to key the inner casing 12 against rotation about the axis L (FIG. 2).

The opposite end portion of the inner casing 12 as shown in FIGS. 1 and 3, is provided with an annular end wall portion 39 extending radially outwardly and slidably received in a mating annular recess 40 formed in the outer casing and keyed thereto in a manner similar to the end wall 33. Accordingly, thermal circumferential and radial expansion of the inner casing 12 relative to the outer casing 11 is also permitted to occur at this connection. However, the end wall portion 39 is provided with a flexible annular web portion 41, so that utilizing the opposite end wall 33 as a reference plane, the inner casing 12 is permitted to elongate in axial direction as well, by deflection of the web 41.

The first row of stationary blades 19 are of hollow form with the outer shroud portion 28 of box-like form and defining an arcuately shaped plenum chamber 43, and the base portion 27 of box-like form and defining an arcuately shaped plenum chamber 44. The chambers 43 and 44 are disposed in fluid communication with each other by the passages 45 formed in the vane portions 26. The blades 19 are preferably formed in groups 47 (as best shown in FIG. 2) with a plurality of the vane portions connected in parallel flow communication with common plenum chambers 43 and 44.

The thus formed blade groups thus extend through a central angle equal to 360° divided by the number of blade groups (in this case 360°/8 or 45°).

Each of the blade groups 47 has a pair of annular flanges 48 and 49 extending from the upstream and downstream sides of the outer shrouds 28 (FIG. 1) and received in mating annular recesses 50 and 51, formed in the inner casing 12, and a pair of screws 52 threadedly received in the inner casing 12 are employed to maintain the flanges 48 and 49 in sealing relation in the recesses 50 and 51.

The outer shroud 28 is also provided with a central aperture 54 disposed in registry with a threaded counterbore 55 having an aperture 56, and a tubular collar 57 is seated in the counterbore 55 and extends into the aperture 54. The collar 57 is maintained in spring biased seating relation with the counterbore 55 by a spring washer 59 secured by a tubular threaded member 61.

The outer casing 11 and the inner casing 12 jointly define an annular space or plenum chamber 62 to which pressurized coolant fluid such as air (from any suitable source) is admitted through an inlet pipe 63.

Accordingly, during operation, with coolant fluid being delivered to the annular plenum chamber 62 to pressurize the same, coolant fluid is directed through the collars 57 associated with each blade group 47 into the outer plenum chambers 43, thence through the passages 45 in the vanes 26 to the inner plenum chambers 44, and finally ejected into the motive fluid stream through a plurality of orifices 64 in the bases 27 with attendant cooling of the above components. It will further be noted that the coolant fluid that issues from the orifices 64 is directed against the root portion of the adjacent rotor blades 25 to effect cooling thereof before entrainment in the hot motive fluid.

By referring to FIG. 1 it will be seen that the outer box-like shroud portions 28 are extended in downstream direction to provide an arcuate portion 66 that substantially overlies the associated rotor blades 15, thereby more effectively guiding the hot motive fluid past the rotor blades and minimizing leakage thereabout.

The remaining rows of stationary rows of blades 20, 21 and 22 may be substantially similar to the row of stationary blades 19, hence no further description is required, except to point out that the outer box-like shroud portions 28 are provided with annular recesses 68 at their downstream edge portions while the outer box-like shroud portions 70 of the next adjacent stationary blade row 20 are provided with annular flanges 71 received in the recesses 68, thereby to minimize leakage of motive fluid therethrough.

As best seen in FIG. 1, for ease of manufacture and service, the inner and outer casings 12 and 11 are preferably divided into upper and lower halves 12a, 12b and 11a, 11b, and provided with flanges 72 and 73, respectively, along the horizontal central plane P–P'. The flanges are bolted together, to provide a seal along the central horizontal plane P–P', by suitable bolts. Also, as previously indicated, the arcuate length of the blade groups 47 is selected so that half of the blade groups are disposed in the upper half 12a of the inner casing and terminate at the horizontal plane while the other half of the blade groups are disposed in the lower half 12b of the inner casing and terminate at the horizontal plane.

With the above arrangement, even though the structure is divided into upper and lower halves, as explained above, leakage of coolant fluid to the blade region from the annular space 62 between the inner and outer casings is substantially eliminated. Accordingly, vibration due to leakage at the horizontal joints is minimized.

Also, vibration due to leakage of coolant fluid from the space 62 into the motive fluid region adjacent the blade groups 47 is substantially eliminated with minimization of blade vibrations due to such leakage.

It will further be seen that thermal expansion of the components during operation is readily accommodated while still maintaining sealing against leakage of coolant fluid from the space 62 into the blade region, and minimizing of thermal stresses that would otherwise occur.

While the invention has been shown in one form, it will be obvious to those skilled in the art that it is not so limited, but is susceptible of various other changes and modifications without departing from the spirit thereof.

I claim as my invention:
1. An axial flow turbine comprising
   an annular row of stationary blades,
   an annular inner casing,
   said blades being received in said inner casing, an annular outer casing encompassing said inner casing and disposed coaxially therewith, a first annular wall portion rigidly connected to one of said casings and slidably received for radial movement in a first annular recess in the other of said casings, a second annular wall portion axially spaced from said first wall portion, said second wall portion being rigidly connected to one of said casings and slidably received for radial movement in a second annular recess in the other of said casings, said first wall being substantially rigid and restraining axial movement but permitting radial movement of said inner casing, and said second wall being flexible in axial direction and permitting axial and radial movement of said inner casing.

2. The structure recited in claim 1, wherein the inner and outer casings jointly define an annular plenum chamber, the stationary blades are provided with internal flow passages communicating with said chamber, and further including means for admitting pressurized coolant fluid to said chamber.

3. The structure recited in claim 2, wherein the stationary blades are of hollow form and comprise a radially extending vane portion, a radially outermost arcuate plenum chamber and a radially innermost plenum chamber disposed in fluid communication with each other, the inner casing is provided with a circumferential inner wall portion within which the stationary blades are nested in an annular array, and further including means for securing the stationary blades to the inner casing, said securing means also providing the coolant fluid flow communication between the annular plenum chamber and the stationary blades.

4. The structure recited in claim 2, wherein the stationary blades are formed in integral groups, each of said groups comprising a plurality of circumferentially spaced vane portions, a radially outermost arcuate plenum chamber and a radially innermost arcuate plenum chamber disposed in fluid communication with each other by the internal flow passages, the inner casing is provided with a circumferential inner wall portion within which said blade groups are nested in an annular array, and further including means for securing each of said blade groups at a central portion to the inner casing, said securing means being yieldable in radial direction to permit thermal expansion of said blade groups in operation, and having an aperture therethrough to conduct coolant fluid from the annular plenum chamber to said blade groups.

5. In an axial flow turbine comprising a rotor having an annular row of blades and rotatable about its central axis, an annular casing encompassing said rotor blades, and an annular row of stationary blades supported within said casing and disposed in axially spaced close proximity with said rotor blades, said stationary blades having a radially extending vane portion, a radially outermost arcuate shroud portion and a radially innermost arcuate base portion, the improvement wherein said outermost shroud portions abut each other to form a continuous outer shroud of annular shape, and have integral portions extending in axial direction to jointly encompass said rotor blades.

6. The structure recited in claim 5, wherein the vane portions, the outer shroud portions and the base portions of the stationary blades are of hollow form, means is provided in the outer shroud portions for admitting pressurized coolant fluid to the stationary blades, and means is provided in the base portions for delivering the coolant from the stationary blades.

7. The structure recited in claim 6, wherein the stationary blades are formed in integral groups, and each of said groups comprising at least two of said hollow vane portions disposed in fluid communication with one outer shroud portion and one base portion.

8. The structure recited in claim 5, and further including an outer annular casing encompassing the inner casing and jointly therewith forming a common plenum chamber, means for admitting pressurized coolant fluid to said common plenum chamber, the stationary blades are of hollow form, and means for directing cooling fluid from said common plenum chamber to said hollow stationary blades.

9. The structure recited in claim 5, and further including a second row of rotor blades, a second row of stationary blades substantially identical to the first-mentioned row of stationary blades, said second row of stationary blades being supported within the casing in axially spaced close proximity with said second row of rotor blades, said second row of stationary blades having outermost shroud portions abutting each other to form a second continuous shroud of annular shape and said second shroud having integral portions extending in axial direction to jointly encompass said second row of rotor blades, and cooperatively associated annular flange and groove means provided in the outer shroud portions of said first and second rows of stationary blades.

10. The structure recited in claim 5 and further including means for securing each of the outer shroud portions to the casing, said securing means including a first member threadedly received in the casing, a second member slidably received in the associated shroud portion, and a spring member interposed therein permitting radial movement of the associated shroud portion occasioned by thermal expansion during operation.

References Cited

UNITED STATES PATENTS

| 2,836,393 | 5/1958 | Payne et al. |
| 3,275,294 | 9/1966 | Allen et al. |
| 3,295,823 | 1/1967 | Waugh et al. |
| 3,362,160 | 1/1968 | Bourgeois _____ 253—78 X |

FOREIGN PATENTS

| 980,869 | 1/1951 | France. |
| 961,588 | 6/1954 | Great Britain. |
| 1,010,300 | 11/1965 | Great Britain. |

EVERETTE A. POWELL, Jr., *Primary Examiner.*

U.S. Cl. X.R.

253—78